United States Patent [19]

Schneider et al.

[11] Patent Number: 4,528,018

[45] Date of Patent: Jul. 9, 1985

[54] TRANSFER STATION FOR A GLASS-FORMING MACHINE

[75] Inventors: Wilhelm Schneider, Auetal; Hans-Georg Seidel, Rinteln, both of Fed. Rep. of Germany

[73] Assignee: Hermann Heye, Obernkirchen, Fed. Rep. of Germany

[21] Appl. No.: 564,344

[22] Filed: Dec. 21, 1983

Related U.S. Application Data

[63] Continuation of Ser. No. 367,968, Apr. 13, 1982, abandoned, which is a continuation-in-part of Ser. No. 260,285, May 4, 1981, abandoned.

[30] Foreign Application Priority Data

May 13, 1980 [DE] Fed. Rep. of Germany ....... 3018232

[51] Int. Cl.$^3$ .................. C03B 35/00; B65G 47/14
[52] U.S. Cl. ........................ 65/260; 65/239; 65/241; 65/375; 198/490; 414/590
[58] Field of Search .............. 65/243, 260, 239, 241, 65/375, 165; 198/576, 598, 723, 739, 746; 414/106, 223, 225, 744 R, 590

[56] References Cited

U.S. PATENT DOCUMENTS

| | | | |
|---|---|---|---|
| 2,007,592 | 7/1935 | Peeson | 414/744 R X |
| 2,018,030 | 10/1935 | Neill et al. | 65/239 |
| 2,839,205 | 6/1958 | Toby et al. | 414/744 R X |
| 2,964,162 | 12/1960 | Sherts et al. | 65/260 X |
| 3,137,394 | 6/1964 | Trudeau | 214/1 |
| 3,230,061 | 1/1966 | Trudeau | 65/241 X |
| 3,235,352 | 2/1966 | Hackett | 65/239 X |
| 3,241,380 | 3/1966 | Howing | 414/744 R X |
| 3,449,104 | 6/1969 | Hamilton | 65/241 X |
| 3,595,365 | 7/1971 | Faure | 65/260 X |
| 3,724,684 | 4/1973 | Butler et al. | 198/739 |
| 3,829,063 | 8/1974 | Holzworth | 414/590 |
| 4,027,767 | 6/1977 | Gluck | 414/223 X |
| 4,189,045 | 2/1980 | Verjux | 198/598 X |
| 4,203,752 | 5/1980 | Becker et al. | 65/323 |
| 4,299,529 | 11/1981 | Ihaba et al. | 414/590 |
| 4,340,413 | 7/1982 | Rowland | 65/375 |
| 4,364,707 | 12/1982 | Ott | 414/590 X |

Primary Examiner—Kenneth M. Schor
Attorney, Agent, or Firm—Michael J. Striker

[57] ABSTRACT

A transfer station of a glass-forming machine includes a depositing plate for receiving at least two transversely spaced glass articles, such as bottles or the like, from the glass-forming machine. The depositing plate is mounted on a vertical shaft for turning therewith about the axis of the latter to move the glass articles thereon from a receiving to a transfer position, and the shaft with the plate is movable in vertical direction into the region of a transfer mechanism arranged to transfer the bottles from the plate to a conveyor adjacent to the plate.

3 Claims, 9 Drawing Figures

TRANSFER STATION FOR A GLASS-FORMING MACHINE

CROSS-REFERENCE TO RELATED APPLICATION

The present application is a continuation of application Ser. No. 367,968, filed Apr. 13, 1982, now abandoned, which in turn is a continuation-in-part application of the application Ser. No. 260,285, filed May 4, 1981, now abandoned.

BACKGROUND OF THE INVENTION

The present invention relates to a transfer station with a depositing plate for simultaneously receiving at least two glass bottles or the like emanating from the glass-forming machine and with a transfer mechanism for transferring the bottles or the like from the depositing plate to a conveyor.

Various transfer stations of the above type are known in the art.

Thus, for instance U.S. Pat. No. 4,203,752 discloses a transfer station in which the depositing plate of each station of the glass-forming machine is stationarily arranged and in which the transfer mechanism of each station tilts back and forth through an angle of 90° during the transfer cycle.

Another transfer station is disclosed in the book "Glasmaschinen" by Giegerich and Trier, published by Springer, 1964, page 308–311, in which the depositing plate is movable from an upper position receiving the bottles or the like emanating from the glass-forming machine to a lower position in the region of the transfer mechanism which transfers the bottles from the depositing plate to a conveyor. The neck molds of the glass-forming machine are in the region of the transfer station not movable in vertical direction. Therefore, in this construction the depositing plate has to be moved downwardly, after opening of the neck molds (FIG. E88f) to the level of the band conveyor, in order to move the necks of the bottles out of the path of movement of the neck molds.

Another transfer station is disclosed in U.S. Pat. No. 3,644,111 in which the neck molds are not arrested in the region of the transfer station, but continue to move in one direction and in which in the same direction a band conveyor is moved below the neck molds onto which the bottles are dropped until the neck of the bottles are located outside the path of the neck molds.

SUMMARY OF THE INVENTION

It is an object of the present invention to provide for a transfer station for a glass-forming machine which is improved in its construction and function over transfer stations known in the art.

It is a further object of the present invention to provide a transfer station of the aforementioned kind which is of relatively simple and rugged construction so that it can be manufactured at reasonable cost and will stand up properly under extended use.

With these and other objects in view, which will become apparent as the description proceeds, the transfer station according to the present invention for a glass-forming machine mainly comprises a housing, a depositing plate turnably mounted on said housing for receiving at least two transversely spaced glass bottles or the like emanating from the glass-forming machine, a conveyor adjacent the depositing plate, means for transferring the at least two bottles or the like from the depositing plate to the conveyor, and means for turning the depositing plate about a vertical axis between a receiving position for receiving the bottles from the glass-forming machine to a transfer position best suited for transfer of the bottles by said transferring means to said conveyor.

The means for turning the depositing plate between the above-mentioned positions thereof preferably comprise a shaft turnably mounted in the housing and fixed to the depositing plate, a drive motor, and transmission means between the motor and the shaft.

The transfer station includes further means for shifting the depositing plate from an upper receiving position receiving the bottles from the glass-forming machine and a lower transfer position in the acting region of the transfer means.

The transfer station according to the present invention is improved over the transfer station as disclosed in the above-mentioned book, in that the depositing plate is not only shiftable in vertical direction but also turnable about a vertical axis between the two above-mentioned positions. This is especially advantageous when, on the one hand, the necks of the bottles have to be removed after opening of the neck molds out of the path of the latter, and on the other hand, for instance if the neck molds of the glass-forming machine move along a circular path, the bottles emanating therefrom have to be moved to a position best suited for the transfer by the transferring means to the conveyor before the actual transfer movement starts. The vertical movement of the depositing plate is necessary because the bottles are still in a partly plastic condition after they leave the finishing molds of the glass-forming machine. If, in this condition, the neck molds would be simply opened at the transfer station and the bottles would be dropped through a considerable distance onto the depositing plate, an undesired deformation of the bottles would result. This is especially the case if the bottles before reaching the depositing plate have to pass relatively high elements, for instance the means for transferring the bottles from the depositing plate to the conveyor.

The means for turning the depositing plate about a vertical axis and the means for shifting the depositing plate from the upper receiving position to the lower transfer position are preferably combined to a single drive unit. Such a construction is not only space-saving, but this construction may also be produced with a minimum of expenditure.

The single drive unit comprises the drive motor and the output shaft thereof and connecting elements connecting the output shaft with the shaft fixed to the depositing plate. The drive motor is preferably an electric motor which is connected to the shaft fixed to the depositing plate for turning the shaft about its axis as well as for shifting the shaft in axial direction.

The connecting elements comprise preferably a crank fixed to the output shaft of the motor, a connecting member fixed to the shaft carrying the depositing plate, a connecting rod, a first universal joint connecting one end of the connecting rod to the crank, a second universal joint connecting the other end of the connecting rod to the connecting member, a guide rod, a third universal joint connecting one end of the guide rod with the connecting member, and a fourth universal joint connecting the other end of the guide rod to the housing, wherein the third universal joint has a center which is located outside of a plane including the center of the second universal joint and the axis of the shaft fixed to the depositing plate.

The third universal joint may be selectively located to one or the other side of the aforementioned plane. Thereby a turning movement of the shaft may be obtained in the one or the other direction. Preferably the fourth universal joint may be arranged on the same side as the third universal joint.

According to another feature of the present invention the depositing plate has at least in the region where the bottles are transferred from the depositing plate to the conveyor an arcuate peripheral portion concentric with the shaft, and this arrangement includes a stationary plate bridging the gap between the arcuate peripheral portion of the depositing plate and the conveyor.

According to a further feature of the present invention, the transfer station may include also means for swivelling the housing and therewith the depositing plate mounted thereon about a swivel axis transversely spaced from and parallel to the axis of the shaft to a position in which the depositing plate is located out of alignment with the bottles emanating from the glass-forming machine. This swivelling of the depositing plate preferably is carried out in a direction away from the conveyor, so that the depositing plate has not to be shifted in vertical direction before swivelling the same about the swivel axis. The swivelling of the depositing plate about the swivel axis is advantageously carried out during the start of operation of the glass-forming machine when the glass articles formed therein are not yet perfect. By swivelling the depositing plate away from the conveyor, it is possible to drop the not yet perfect glass articles after opening of the neck mold onto an additional conveyor for feeding the imperfect glass articles away from the glass-forming machine.

The means for swivelling the housing and the depositing plate mounted thereon about the swivel axis preferably comprise a swivel shaft having an axis coinciding with the swivel axis, the housing being fixed to the swivel shaft for swivelling therewith about the axis of the latter, a lever fixed at one end to the swivel shaft, and a swivelling motor connected to the other end of the lever. The swivelling motor is preferably in form of a fluid-operated manually controllable double-acting fluid-operated cylinder-and-piston unit.

The novel features which are considered characteristic for the invention are set forth in particular in the appended claims. The invention itself, however, both as to its construction and its method of operation together with additional objects and advantages thereof, will be best understood from the following description of specific embodiments when read in connection with the accompanying drawing.

DESCRIPTION OF THE PREFERRED EMBODIMENTS

Figure 1:
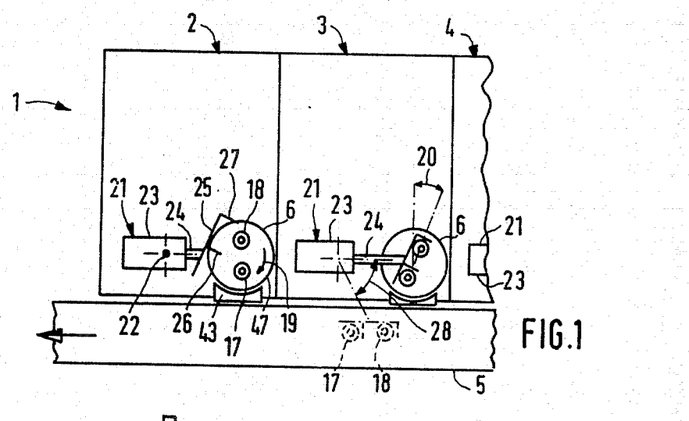
FIG. 1 is a schematic top view of a part of a so-called I.S. glass-forming machine.
Figure 2:
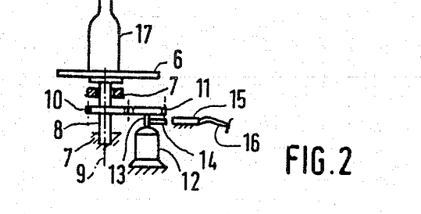
FIG. 2 is a side view of part of the machine shown in FIG. 1 drawn to a slightly larger scale.

FIG. 1 schematically illustrates part of a so-called I.S. glass-forming machine 1 with a plurality of sections 2, 3 and 4 with which a common band conveyor 5 is coordinated. Each section 2, 3 and 4 has a depositing plate 6, which in the top view is of circular shape, and which, as shown in FIG. 2, is mounted on the upper end of shaft 8, turnably mounted in a housing 7 of the glass-forming machine 1. The shaft 8 is turnable together with the depositing plate 6 about a vertical axis 9. A gear 10 is fixed to the shaft 8 for rotation therewith and the gear 10 meshes with a pinion 11 on the output shaft of a drive motor 12, constructed as an electromotor. The drive motor 12 is stationarily arranged. Its output shaft 13 carries a radially extending lug 14 which cooperates with a magnet switch 15 without touching the latter. When the lug 14 is aligned with the magnet switch 15, the latter produces over an electric conduit 16 a stop signal in an electronic control circuit, as will be explained later on in connection with FIGS. 7-9. The drive motor 12 is preferably a permanent excited direct-current gear motor, the revolutions per minute of which are steplessly regulatable.

As shown in FIG. 1, two glass articles, for instance bottles 17 and 18, have just been deposited in section 2 transversely spaced from each other by not-illustrated grippers onto the depositing plate 6. The drive motor 12 is now switched on, in a manner not specifically described, and turns the depositing plate 6 about the vertical axis 9 in the direction of the arrow 19 from the receiving position, as shown at section 2, to a transfer position, as shown at section 3, through an angle 20. In this transfer position, the lug 14, shown in FIG. 2, actuates the magnet switch 15, so that a stop signal passes over the electric conduit 16 to the mentioned electronic control circuit to stop the drive motor 12.

Each section 2, 3 and 4 is further provided with a transfer mechanism 21 comprising a fluid-operated, horizontally arranged cylinder-and-piston unit 23 which is turnable about a vertical axis 22. The piston rod 24 of the unit 23 carries a pusher 25 provided with a pair of fingers 26 and 27 projecting spaced from each other substantially normal to the pusher 25, which cooperate in the following manner with the glass articles 17 and 18.

As soon as the depositing plate 6 reaches its transfer position, as shown in the section 3, the piston rod 24 is moved outwardly, until the fingers 26 and 27 are located rearwardly of the glass articles 17 and 18 as shown for the section 3. Subsequently thereto the unit 23 is turned by not illustrated means about the vertical axis 22 through an angle 28, until the pusher 25 reaches an end position over the band conveyor 5 as shown in dotted lines for the section 3. In this end position the pusher 25 transfers the glass articles 17, 18 onto the band conveyor 5. The piston rod 24 is in this position withdrawn into the cylinder of the unit 23 in such a manner that the finger 26 will not engage the trailing glass article 18. Subsequently thereto the cylinder-and-piston unit 23 is again turned back through the angle 28 into the position as shown in full lines for the sections 2, 3 and 4.

The means for turning the cylinder-and-piston unit 23 are described and illustrated in detail in the above-mentioned U.S. Pat. No. 4,203,752.

The angle 28 is preferably smaller than 90°, whereby the transfer process is advantageously influenced.

Figure 3:
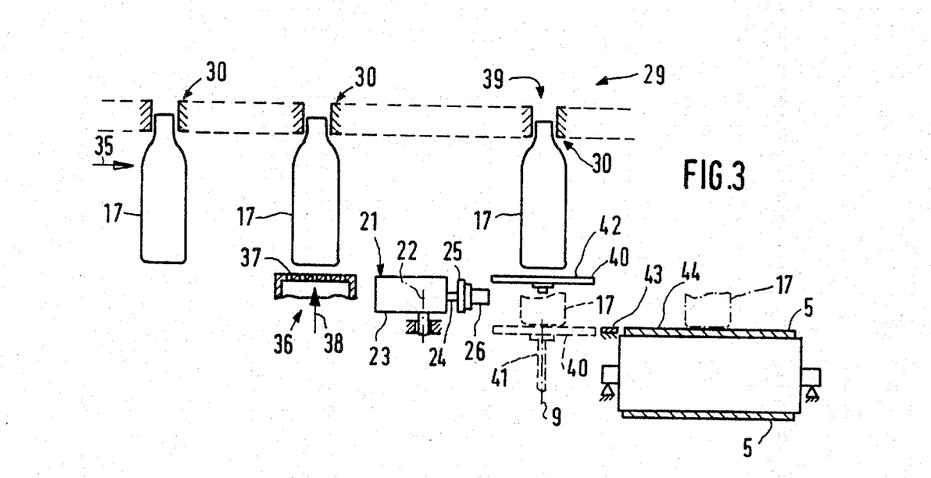
FIG. 3 is a schematic partially sectioned side view of a modification, shown projected into a plane.
Figure 4:
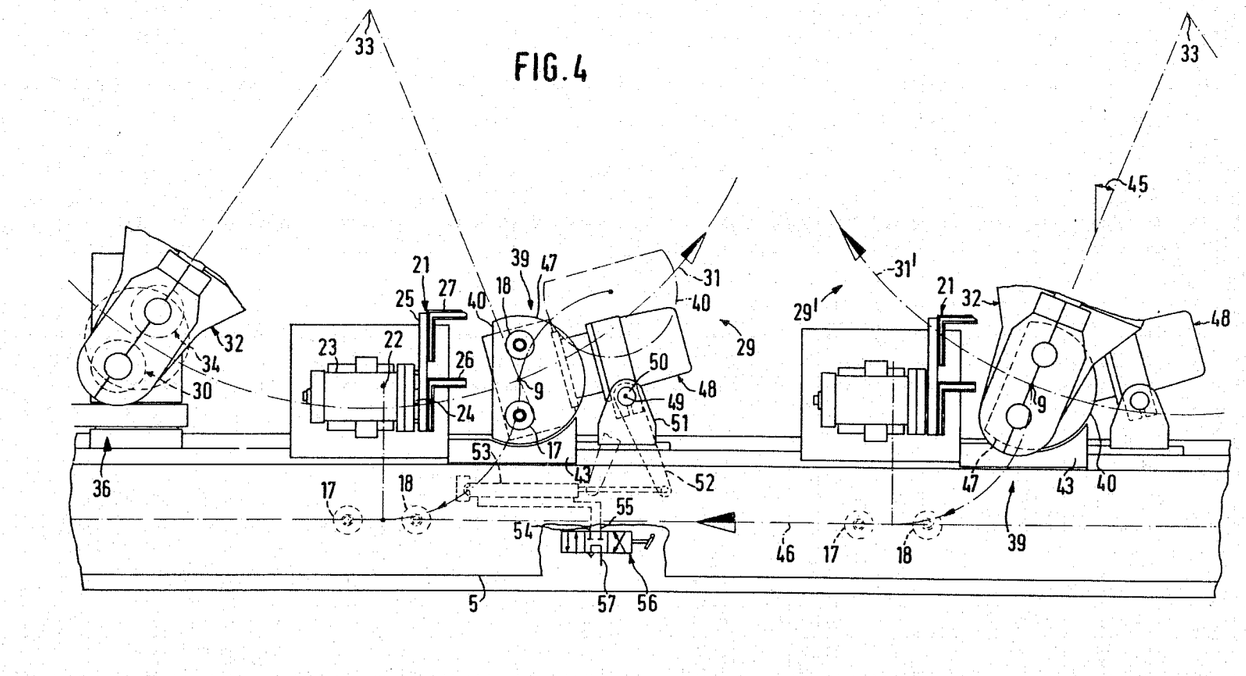
FIG. 4 is a top view of part of a glass-forming machine according to FIG. 3.

FIG. 3 schematically illustrates part of a glassforming machine 29, the details of which are illustrated and described in the above-mentioned U.S. Pat. No. 3,644,111. The glass-forming machine 29 operates according to the double gob principle, that is, it produces at each section simultaneously two articles 17 and 18, as is also the case with the IS glass-forming machine 1 according to FIG. 1. The glass-forming machine 29 is provided with a plurality of neck mold holders 32 respectively movable independently from each other along a circular path 31 (FIG. 4). The neck mold holders 32 rotate about a common central axis 33 and are stopped at the operating stations of the machine and respectively carry neck molds 30 and 34 for the glass articles 17 and 18.

The neck molds 30 and 34 remain during the complete working cycle at one elevation, as schematically shown for the molds 30 in FIG. 3. After releasing of the glass articles 17 and 18 from the non-illustrated finish molds, the glass articles 17 and 18 are transported suspended on the neck molds in the direction of the arrow 35 over a bottom cooling station 36 of the glass-forming machine 29 and arrested at this station. Cooling air passes through the perforated bottom 37 of the bottom cooling station 36 in the direction of the arrow 38 and cools the bottoms of the glass articles. The glass articles 17 and 18 are subsequently thereto further moved in the direction of the arrow 35 to a transfer station 39 and there arrested. The neck molds 30 and 34 are then opened so that the glass articles 17 and 18 drop onto a depositing plate 40, arranged only a short distance below the glass articles 17 and 18 at a receiving position shown in full lines in FIG. 3. The depositing plate 40 is fixedly connected to the upper end of a shaft 41, which, in a manner to be described below, is turnable about its axis and reciprocatable in axial direction.

After the glass articles 17 and 18 are deposited onto the depositing plate 40, the latter is turned through a certain angle and lowered to the transfer position shown in dotted lines in FIG. 3, in which the upper surface 42 of the depositing plate 40 is aligned with a stationary intermediary plate 43 and with the upper surface 44 of the band conveyor 5. In this position of the depositing plate 40, the transfer device 21 pushes, as described above in connection with FIG. 1, the glass articles 17 and 18 from the depositing plate 40 over the intermediate plate 43 onto the center of the band conveyor 5. Subsequently thereto the depositing plate 40 is turned back to its original position and lifted to the position shown in full lines in FIG. 3 to thus be ready to receive the following glass articles 17 and 18.

FIG. 4 illustrates to the right side of the glass-forming machine 29 part of a substantially identical glass-forming machine 29', the neck mold holders 32 of which move along a circular path 31' in a direction opposite the movement of the neck mold holder 32 of the glass-forming machine 29. The two paths 31 and 31' meet at a point through which the longitudinal axis of a non-illustrated, for both glass-forming machines 29 and 29' common press station extends. The glass-forming machines 29 and 29' produce the glass articles 17 and 18 according to the known press and blow method.

The depositing plate 40 at the transfer station 39 of the glass-forming machine 29' is shown in its turned receiving position and its raised position as shown in full lines in FIG. 3. The neck molds 30 and 34 are opened in this position of the depositing plate 40 to let the glass articles 17, 18 drop onto the depositing plate 40. The depositing plate 40 is subsequently thereto lowered to its transfer position, as shown in dotted lines in FIG. 3, and thereby turned in counterclockwise direction through an angle 45 to the turned transfer position as shown in FIG. 4 for the depositing plate 40 of the glass-forming machine 29. The depositing plate 40 of the glass-forming machine 29 is contrary to the depositing plate 40 of the glass-forming machine 29' turned about the vertical axis 9 in clockwise direction from its receiving position to its turned transfer position.

As soon as the depositing plate 40 is lowered and turned to its transfer position, the piston rod 24 and its pusher 25 of the corresponding transfer device 21 is extended. Subsequently thereto, the cylinder-and-piston unit 23 is turned about the vertical axis 22 until the glass articles 17 and 18 are placed behind each other on the centerline 46 of the band conveyor 5.

At least the peripheral region 47 of the depositing plate 40, which is traversed during the transfer of the glass articles 17 and 18 from the depositing plate 40 onto the conveyor 5 is defined by an arc concentric with the axis of the shaft 41. The gap existing during the transfer between the depositing plate 40 and the band conveyor 5 is bridged over by a stationary intermediate plate 43.

The shaft 41 is turnable and axially shiftably mounted in a housing 48. The housing 48 may be swivelled about the swivel axis 49 of a swivel shaft 50 arranged eccentrically at a certain distance from the vertical axis 9 of the shaft 41 out of alignment with the glass articles 17 and 18 respectively emanating from the glass-forming machines 29 and 29'. The swivel shaft 50 is turnably mounted in a bearing fork 51 of the transfer station 39 and carries a lever 52, to the free end of which the piston rod of a double-acting fluid-operated cylinder-and-piston unit 53 is pivotally connected, while the end of the cylinder of the unit 53 opposite to the piston rod thereof is pivotally connected to a stationary part of the transfer station 39. The cylinder-and-piston unit 53 is connected by conduits 54 and 55 with a four-port/-three-position valve 56 in turn connected to a conduit 57 through which pressure fluid from a non-illustrated source is transmitted to the valve 56. If the valve 56 is, for instance manually, moved from the position shown in FIG. 4 towards the right, the lever 52 is turned from its right normal position shown in dotted lines into the dash-dotted line shown left end position. Thereby the swivel shaft 50 with the housing 48 and the despositing plate 40 is turned in the same direction so that the depositing plate 40 will be moved to an end position shown in FIG. 4 at the glass-forming machine 29 in dash-dotted lines. Newly arriving glass articles 17 and 18 may in this end position of the depositing plate 40 drop directly onto a non-illustrated cullet return guide and do not pass onto the band conveyor 5.

Figure 5:
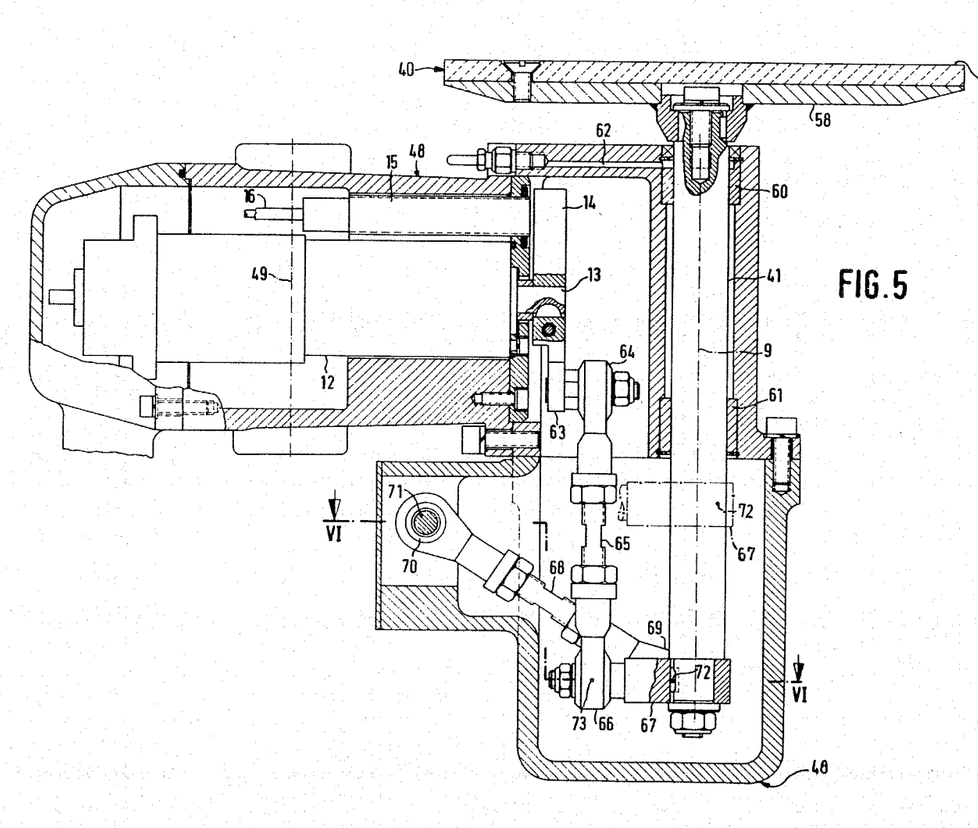
FIG. 5 is a vertical cross-section through part of the machine according to FIG. 4 at an enlarged scale.

As shown in FIG. 5 the depositing plate 40 comprises a carrier plate 58 fixedly connected with the shaft 41 for turning therewith and a top plate 59 connected by screws with the carrier plate 58 and consisting of refractory, non-metallic material having low heat-conductive characteristics.

The shaft 41 is mounted in the housing 48 by two sleeve bearings 60 and 61 which, through a bore 62 in a wall of the housing 48, are provided with lubricating material.

The drive motor 12 is mounted in the housing 48 and a crank 63 integral with the lug 14 is mounted on the output shaft 13 of the drive motor 12 for turning with the output shaft 13. The crank 63 is connected by a first universal joint 64, constructed as a ball joint, with one end of a connecting rod 65 and the other end of the connecting rod 65 is connected over a second universal joint 66, likewise constructed as a ball joint, with a connecting member 67 fixed to the lower end of the shaft 41 for movement therewith. A guide rod 68 is at one end connected by a third universal joint 69, likewise constructed as a ball joint, with the connecting member 67 and the other end of the guide rod 68 is connected by means of a fourth universal joint 70, likewise constructed as a ball joint, with a bolt 71 mounted in the housing 48.

Figure 6:
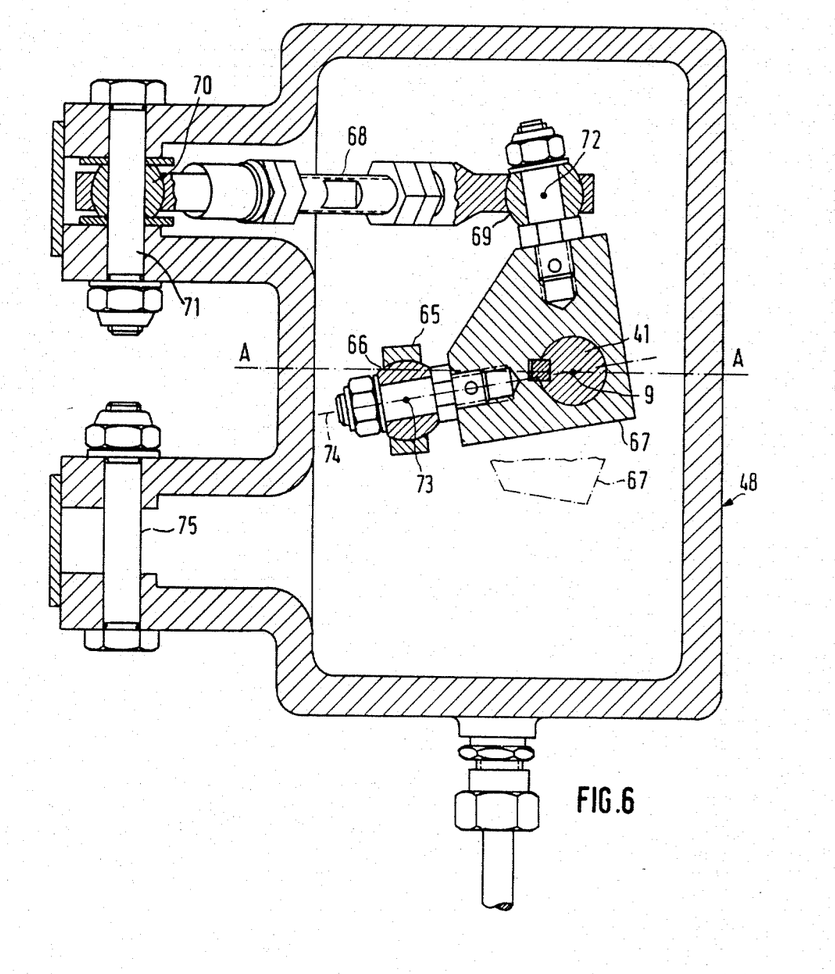
FIG. 6 is a cross-section taken along the line VI—VI of FIG. 5.

The center 72 of the third universal joint 69 is as shown in FIG. 6, arranged outside of a plane 74 including the center 73 of the second universal joint 66 and the vertical axis 9 of the shaft 41. The third universal joint 69 and the fourth universal joint 70 are arranged, as shown in FIG. 6, above the plane 74, but these two universal joints could also be arranged below the plane 74. For this purpose it would only be necessary to disengage the connecting member 67 from the shaft 41 and to turn the same through 180° about the axis A—A and in this turned position again mount it on the shaft 41 in the position as partly indicated in dash-dot lines in FIG. 6. The fourth universal joint 70 is then mounted on an additional bolt 75 of the housing 48. In this way it is possible to obtain lifting and rotation of the depositing plate 40 in one or the other direction, as for instance necessary for the glass-forming machines 29 and 29' according to FIG. 4.

Figure 7:
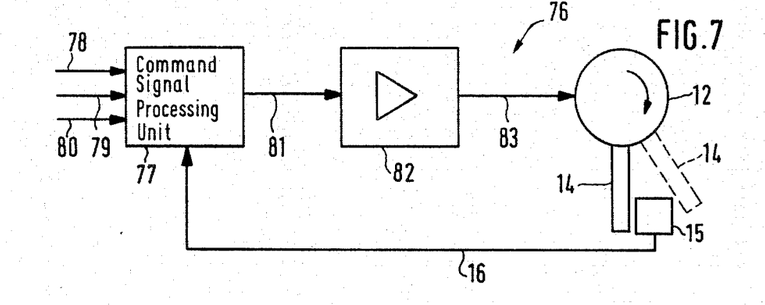
FIGS. 7-9 illustrate different electronic control circuits for the drive motor of the transfer stations according to the present invention.

FIG. 7 schematically illustrates an electronic control circuit 76 for the drive motor 12 which is constructed as a permanent excited direct-current gear motor the speed of which is steplessly regulatable. An electric conductor 16 leads to a command signal processing unit 77, the details of which are fully described in the aforementioned U.S. Pat. No. 4,203,752. Starting signals from a control of the glass-forming machine are transmitted over a further input of the command signal processing unit over an electric conductor 78. The unit 77 receives over an electric conductor 79 a desired speed value in form of a voltage value and an additional input, that is a desired position value, likewise as a voltage value over an electric conductor 80. The command signal processing unit 77 transmits over an electric conductor 81 a desired voltage value to a power amplifier 82, connected by an electric conductor 83 with the drive motor 12.

As soon as the lug 14 reaches the dotted-line position shown in FIG. 7 and therewith the magnet switch 15 the command signal processing unit 77 is switched over from the desired speed value to the desired position value, so that the drive motor moves slowly to its desired end position.

Figure 8:
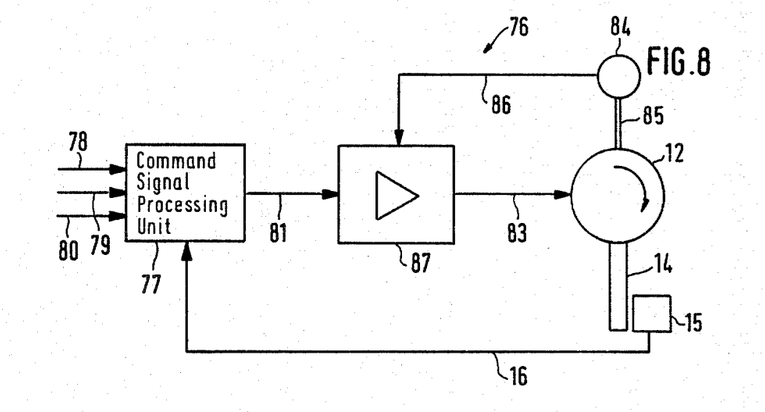

The electronic control circuit 76 according to FIG. 8 differs from the control circuit shown in FIG. 7 in so far as a tachogenerator 84 is over the drive connection 85 coupled with the drive motor 12 and connected by means of the electric conductor 86 with the control input of a regulatable power amplifier 87.

Figure 9:
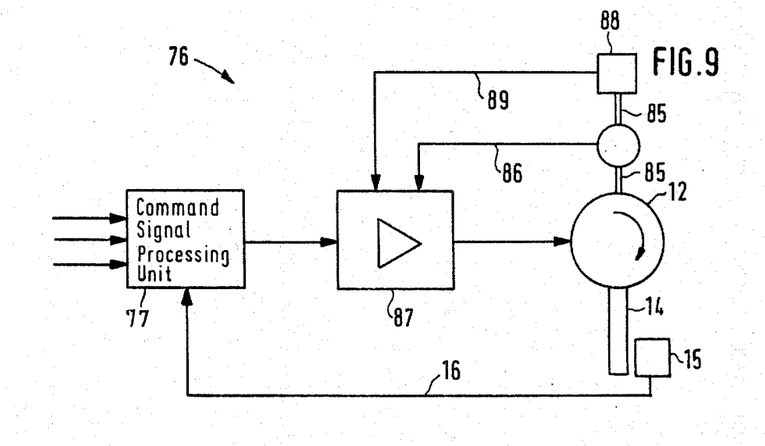

A further modification of the electronic control circuit 76 is shown in FIG. 9 in which a turning angle indicator 88 is likewise connected to the drive connection 85 and in which the indicator 88 is connected over an electric conductor 89 with a further control input of the regulatable power amplifier 87.

Further details of the electronic control circuit shown in FIGS. 8 and 9 are described in the above mentioned U.S. Pat. No. 4,203,752.

It will be understood that each of the elements described above, or two or more together, may also find a useful application in other types of transfer stations for glass-forming machines differing from the types described above.

While the invention has been illustrated and described as embodied in a transfer station for a glass-forming machine in which glass articles emanating from the machine are deposited on a depositing plate and subsequently transferred onto a conveyor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A transfer station in combination with a glass-forming machine having a discharging station and with a conveyor for glass articles, which conveyor is laterally offset relative to said discharging station, and which transfer station transfers onto said conveyor a plurality of glass articles discharged at said discharging station from the glass-forming machine, said transfer station comprising a depositing plate for simultaneously receiving said plurality of glass articles discharged at said discharging station; a vertical shaft connected at one end thereof to the depositing plate; a housing supporting the shaft for rotation about a vertical axis and guiding the shaft for movement along the vertical axis; a drive unit including a drive motor having an output shaft; coupling means for coupling the output shaft with the vertical shaft (1) to move the depositing plate along the vertical axis between a raised receiving position at said discharging station and a lowered transferring position at said conveyor and (2) to rotate the depositing plate about the vertical axis between a receiving angular position at said discharging station and a transferring angular position at said conveyor; means for simultaneously transferring said plurality of glass articles from the depositing plate to said conveyor when the depositing plate is in said transferring position; said coupling means including a crank fixed to the output shaft to rotate in a plane which extends substantially parallel to said vertical axis, a connecting member fixed to said vertical shaft, at a location below said crank, a connecting rod, a first universal joint connecting one end of said connecting rod to said crank, a second universal joint connecting the other end of said connecting rod to said connecting member, a guide rod, a third universal joint connecting one end of said guide rod to said connecting member, and a fourth universal joint connecting the other end of said guide rod to said housing, said third universal joint having a center which is located outside of another plane including the center of said second universal joint and the longitudinal axis of said vertical shaft.

2. A transfer station as defined in claim 1, wherein said third universal joint is selectively arranged on one or the other side of said another plane.

3. A transfer station as defined in claim 2, wherein said fourth universal joint is located at the same side of said another plane as said third universal joint.

* * * * *